US006630543B1

(12) United States Patent
Doane et al.

(10) Patent No.: US 6,630,543 B1
(45) Date of Patent: Oct. 7, 2003

(54) METHOD OF MAKING BIODEGRADABLE POLYMER COMPOSITIONS

(75) Inventors: William M. Doane, Morton, IL (US); Wayne Xu, Charlotte, NC (US); Michael N. Mang, Eden Prairie, MN (US); Jerry E. White, Lake Jackson, TX (US); Julious L. Willett, Morton, IL (US)

(73) Assignees: Biotechnology Research and Development Corporation, Peoria, IL (US); The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 09/763,339

(22) PCT Filed: Aug. 19, 1999

(86) PCT No.: PCT/US99/18752

§ 371 (c)(1),
(2), (4) Date: May 30, 2001

(87) PCT Pub. No.: WO00/11064

PCT Pub. Date: Mar. 2, 2000

Related U.S. Application Data

(60) Provisional application No. 60/097,704, filed on Aug. 21, 1998.

(51) Int. Cl.$^7$ ............................................. C08F 251/00
(52) U.S. Cl. ..................... 525/450; 525/54.24; 524/51; 521/109.1; 521/182; 528/354
(58) Field of Search ............... 521/84.1, 109.1, 521/182; 524/51; 528/354; 525/450, 54.24

(56) References Cited

U.S. PATENT DOCUMENTS

| | | | | |
|---|---|---|---|---|
| 5,132,133 A | * | 7/1992 | Huber et al. | 426/241 |
| 5,171,820 A | | 12/1992 | Mang et al. | 528/87 |
| 5,384,187 A | | 1/1995 | Uemura et al. | 428/262 |
| 5,391,423 A | | 2/1995 | Wnuk et al. | 428/217 |
| 5,397,587 A | * | 3/1995 | Thompson et al. | 426/331 |
| 5,412,005 A | | 5/1995 | Bastioli et al. | 524/47 |
| 5,496,910 A | | 3/1996 | Mang et al. | 528/88 |
| 5,625,029 A | * | 4/1997 | Hubbs et al. | 528/354 |
| 5,665,786 A | * | 9/1997 | Xu et al. | 521/109.1 |
| 5,703,160 A | | 12/1997 | Dehennau et al. | 525/54.24 |
| 5,759,569 A | * | 6/1998 | Hird et al. | 424/443 |
| 5,783,240 A | * | 7/1998 | Wenger et al. | 426/231 |
| 5,783,271 A | | 7/1998 | Nishida et al. | 428/35.5 |
| 5,821,286 A | | 10/1998 | Xu et al. | 524/47 |
| 5,852,078 A | | 12/1998 | Willett et al. | 524/35 |
| 5,874,486 A | | 2/1999 | Bastioli et al. | 523/128 |
| 5,981,237 A | * | 11/1999 | Meagher et al. | 435/151 |

FOREIGN PATENT DOCUMENTS

| | | |
|---|---|---|
| EP | 0 741 178 A2 | 5/1995 |
| EP | 0 667 369 A1 | 8/1995 |
| WO | WO 97/23564 | 7/1997 |

OTHER PUBLICATIONS

"Filling of Poly(Lactic Acid) With Native Starch", S. Jacobsen and H. G. Fritz, Polymer Engineering & Science, Society of Plastics Engineers, vol. 36, No. 22, pp. 2799–2804, Nov. 1, 1996.

"Physical Properties of Poly(Lactic Acid) and Starch Composites With Various Blending Ratios", T. Ke and X. Sun, Cereal Chemistry, American Association of Cereal Chemists, vol. 77, No. 6, pp. 761–768, Nov. 6, 2000.

* cited by examiner

*Primary Examiner*—David W. Wu
*Assistant Examiner*—Henry S. Hu
(74) *Attorney, Agent, or Firm*—Bliss McGlynn, P.C.

(57) ABSTRACT

A method of making a biodegradable polymer composition including the steps of providing a first component being either one of a thermoplastic poly(hydroxy ester ether) or a synthetic, hydroxy-functional polymer and providing a second component being a natural polymer. The method includes the steps of mixing the first component and second component together to form a mixture, compounding the mixture, and pelletizing the compounded mixture to form pellets of a biodegradable polymer composition.

21 Claims, No Drawings

METHOD OF MAKING BIODEGRADABLE POLYMER COMPOSITIONS

CROSS-REFERENCE TO RELATED APPLICATION(S)

The present application claims the priority date of copending International Application No. PCT/US99/18752, filed Aug. 19, 1999, which was based on provisional application Serial No. 60/097,704, filed Aug. 21, 1998.

GOVERNMENT RIGHTS IN INVENTION

The present invention was made with government support under Grant Agreement No. 59-3K95-3-126 awarded by the United States Department of Agriculture, Agricultural Research Services. The government has certain rights in this invention

BACKGROUND OF THE INVENTION

1. Field of the Invention

The present invention relates generally to methods of making compositions and, more particularly, to a method of making a biodegradable polymer composition.

2. Description of the Related Art

Starches and modified starches have been the focus of considerable research interest in attempts to use these as fillers in order to decrease polymer costs and to use polymers that are biodegradable. Several recent examples, U.S. Pat. No. 5,384,187, issued Jan. 24, 1995, inventors Uemura et al., U.S. Pat. No. 5,391,423, issued Feb. 21, 1995, inventors Wnuk et al., and U.S. Pat. No. 5,412,005, issued May 2, 1995, inventors Bastioli et al., all represent domestic and foreign based attempts to achieve biodegradable polymer compositions in which natural polymers such as starches have been added to synthetic polymers.

One disadvantage associated with the above compositions is in the mixing of the synthetic polymer and the natural polymer. Typically, the natural polymer is in a dry form and is therefore, messy to mix with the synthetic polymer. Also, special handling equipment is needed for the natural polymer. Therefore, there is a need in the art to provide a method of making polymer compositions that are biodegradable reasonably competitive in price with commodity plastics such as polyethylene or polystyrene but which are cleaner to mix and eliminate the need for special handling equipment.

SUMMARY OF THE INVENTION

Accordingly, the present invention is a method of making a biodegradable polymer composition. The method includes the steps of providing a first component being either one of a thermoplastic poly(hydroxy ester ether) or a synthetic, hydroxy-functional polymer and providing a second component being a natural polymer. The method includes the steps of mixing the first component and second component together to form a mixture, compounding the mixture, and pelletizing the compounded mixture to form pellets of a biodegradable polymer composition.

The compositions are useful in various processes such as molding, extruding and casting to form expanded articles, films and laminates. The synthetic, hydroxy-functional polymer may be as described by U.S. Pat. No. 5,171,820, inventors Mang and White, issued Dec. 15, 1992, U.S. Pat. No. 5,496,910, inventors Mang, White and Swanson, issued Mar. 5, 1996 and PCT application published as International Publication No. WO 97/23564, on Jul. 3, 1997, inventors Mang and White. Natural polymers for mixture with the synthetic, hydroxy-functional polymers include polysaccharides, modified polysaccharides, naturally-occurring fibers, and particulate fillers. Particularly preferred as the natural polymer are starches.

One advantage of the present invention is that a method is provided of making a biodegradable polymer composition. Another advantage of the present invention is that the method produces an extrudable composition by melt processing a thermoplastic poly(hydroxy ester ether) or a hydroxy-functional polymer with a natural polymer. Yet another advantage of the present invention is that the method compounds the mixture in at least one compounding step and pelletizes the compounded mixture. Still yet another advantage of the present invention is that the compounded composition is pelletized for further processing in various processes such as extruding. A further advantage of the present invention is that the method is cleaner to mix the natural polymer and eliminates the need for special handling equipment for the natural polymer.

Other features and advantages of the present invention will be readily appreciated as the same becomes better understood after reading the subsequent description examples and the appended claims.

DESCRIPTION OF THE PREFERRED EMBODIMENT(S)

Broadly, the present invention is a method of making a biodegradable polymer composition comprising two main components: the first component is either a thermoplastic poly(hydroxy ester ether) or a synthetic hydroxy-functional polymer more particularly, an hydroxy-functional polyester having a repeating structure as will hereinafter be described and the second component is a natural polymer. The natural polymer may be, for example, a polysaccharide, a modified polysaccharide, or a naturally occurring fiber or particulate filler, but preferably is starch or a modified starch.

While the amount of hydroxy-functional polymer selected for use depends on a variety of factors including the specific polymer employed and the desired end uses of the composition, in general hydroxy-functional synthetic polymers can be present in an amount of from 1 to 99 wt. %, preferably from 1 to 95 wt. %, and most preferably from 10 to 90 wt. %, based on the total weight of the hydroxy-functional polymer and the natural polymer. Particularly preferred compositions for forming films have natural polymer present as less than about 50 wt. % of the total composition; and hydroxy-functional, synthetic polymer present in amounts from at least about 10 wt. % to about 70 wt. %.

Natural polymers contemplated for use include biodegradable organic fillers, such as cellulose and other fibers and the like, which are well known. Naturally occurring fibers or particulate fillers which can be employed in the practice of the present invention for preparing the composition are, for example, wood flour, wood pulp, wood fibers, cotton, flax, hemp, or ramie fibers, rice or wheat straw, chitin, chitosan, cellulose materials derived from agricultural products, nut shell flour, corn cob flour, and mixtures thereof. Polysaccharides which can be employed in the practice of the present invention for preparing the composition are the different starches, celluloses, hemicelluloses, gums, pectins, and pullulans. Polysaccharides are known and are described, for example, in *Encyclopedia of polymer Science and Technology*, 2nd edition, 1987.

Modified polysaccharides which can be employed in the practice of the present invention for preparing the composition are the esters and ethers of polysaccharides, such as, for example, cellulose ethers and cellulose esters, or starch esters and starch ethers. Modified polysaccharides are known and are described, for example, in *Encyclopedia of Polymer Science and Technology*, 2nd edition, 1987.

The natural polymer is in granular or fiber form (sometimes hereinafter referred to as the "granular embodiment") or in a gelatinized or thermoplastic form.

When practicing the granule embodiment of the present invention, the granules of natural polymer preferably will have a particle size of less than about 100 μm, and more preferably have a particle size of up to about 50 μm and a water content of less than about 15 wt. %, more preferably less than about 10 or 11 wt. %. In the granule embodiment, the two main components may be admixed in varying amounts. The natural polymer may be present in a trace amount or in greater amounts up to a weight ratio with respect to the hydroxy-functional polymer of about 8:1, more preferably up to about 6:1.

When practicing the present invention so as to obtain the gelatinized or thermoplastic form, the preferred starch component is derived from a gelatinized starch or a gelatinized modified starch. "Modified" is meant that the starch can be derivatized or modified by typical processes known in the art (e.g. esterification, etherification, oxidation acid hydrolysis, cross-linking and enzyme conversion). Thus, for example, a modified starch may be a starch ester, a starch ether, or a cross-linked starch. Conventional modifications of starch are described in publications such as *Starch: Chemistry and Technology*, 2nd edition, editor Whistler et al., and *Starch Derivatives: Production and Uses*, Rutenberg et al., Academic Press, Inc., 1984.

When starch is said to be "gelatinized" it has melted and lost its crystalline state. The starch molecules have taken on a random, disordered configuration and the starch chains have become entangled. Thus, the starch is thermoplastic and is sometimes referred to as "destructured." When the gelatinized starch is admixed with the synthetic polymer under extrusion conditions so that the entire admixture is molten, the two molten polymers (natural polymer and synthetic polymer) would be expected to be homogeneously dispersed throughout the body of the extrudate in the respective proportions of each component; however, this normally does not seem to occur. Instead, the synthetic polymer has been found typically to partition so as to predominate along exterior surfaces and to remain as the predominate component along such exterior surfaces.

Suitable Hydroxy-Functional Polymers

The preparation and structures for hydroxy-functional polymers such as hydroxy-functional polyesters, suitable in practicing the present invention may be as described by U.S. Pat. No. 5,171,820, inventors Mang and White, issued Dec. 15, 1992, and U.S. Pat. No. 5,496,910, inventors Mang, White and Swanson, issued Mar. 5, 1996, the disclosures of which are hereby incorporated in their entireties by reference. Such useful hydroxy-functional polyesters for the present invention may be prepared from base-catalyzed nucleophilic addition of suitable acids to epoxies which reaction generates both an ester linkage and a pendent hydroxyl group. Transesterification and cross linking reactions are eliminated through use of quatemary anmmornium halide salts as initiators for the reaction of diacids with diglycidyl ethers, providing convenient preparation of high molecular weight, thermoplastic hydroxy-functional polyesters in ether solvents at temperatures from 80° C.–160° C. Data provided by the Dow Chemical Company (manufacturer of hydroxy-functional polyesters such as described by U.S. Pat. Nos. 5,171,820 and 5,496,910) indicates the biodegradable nature of these polymers through the ability of various soil bacteria (such as Pseudomonas putida) to use the synthetic polymers as a substrate for cell culture growth.

Representative structures for suitable hydroxy-functional polyesters in practicing the present invention are represented by Formula A (where n provides a sufficient molecular weight, such as for example a m.w. of about 50,000–100.000. Higher molecular weights are preferred due to higher strength.

FORMULA A

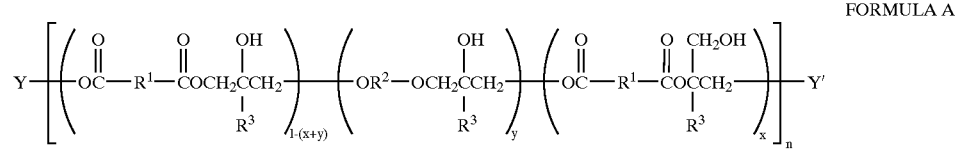

In Formula A each of $R^1$ and $R^2$ is individually a divalent organic moiety which is predominately hydrocarbon, each $R^3$ is individually a hydrogen or lower alkyl, y is a fraction from 0 to 0.5 and x is a fraction from about 0.05 to about 0.4. Typically Y is hydrogen or glycidyl and YN is glycidyl arylene ether, glycidyl alkylene ester, glycidyl alkylene ether or glycidyl arylene ester.

FORMULA B

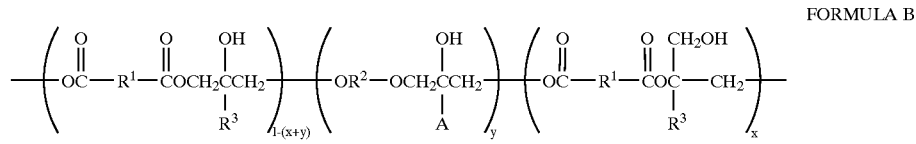

Such polyesters may be prepared from diglycidyl esters of an aliphatic diacid such as adipic due to the ready availability and reasonable price for adipic acid as a source of reactant. Other particularly preferred polyesters may be prepared from dihydric phenols, such as hydroquinone.

Four particularly preferred hydroxy-functional polyesters, used extensively to illustrate (but not to limit) the present invention, are sometimes hereinafter designated "BIS CHD," "BIS adipic," "HQ DDCA" and "BIS DDCA." These polymers will include some repeating unit structures, where the repeating units are illustrated respectively by Formulas C—F. Several of their properties of interest for the present invention are summarized in Table A.

TABLE A

| Hydroxy-Functional Polyester Components | Tg (° C.) | Tensile Strength (Mpa) | % Elongation |
| --- | --- | --- | --- |
| BIS CHD | 66 | 60–61 | 172 |
| BIS adipic | 45 | 12 | 157 |
| HQ DDCA | 10 | 14 | 612 |
| BIS DDCA | 20 | 1.2 | 487 |

Similarly, if one wished to formulate an inventive embodiment with outstanding tensile strength, a hydroxy-functional polyester such as BIS CHD could be chosen;

FORMULA C

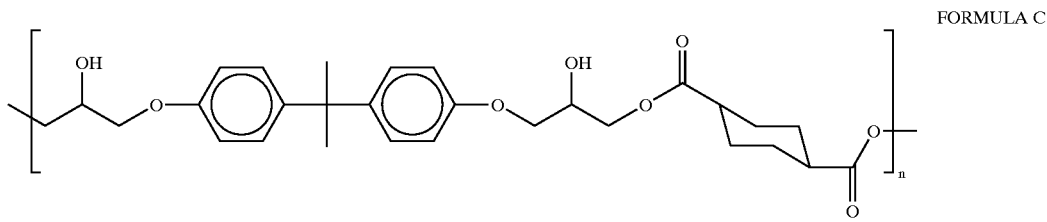

FORMULA D

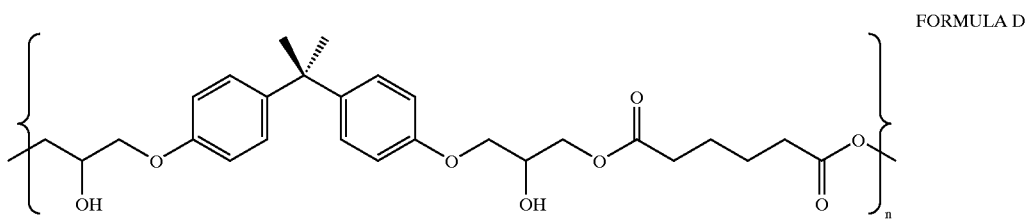

FORMULA E

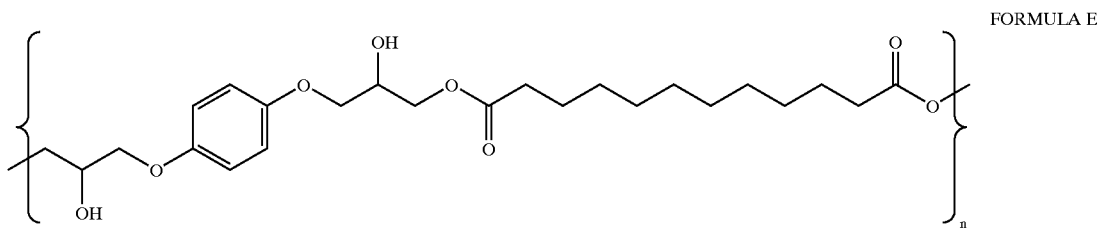

FORMULA F

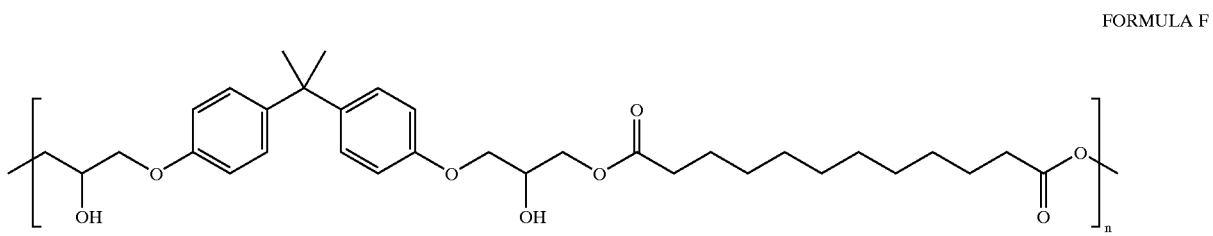

In Formulas C—F, "n" preferably is as earlier described.

With reference to the data of Table A, one sees that two of the hydroxy-functional polyesters used to illustrate the granule embodiment of the present invention have a quite high percentage elongation property (HQ DDCA and BIS DDCA). Thus, one would tend to choose one of these (or another with a relatively high percentage elongation property) when one wished to formulate an embodiment of the present invention that had high percent elongation.

however, due to the remarkable compatibility of natural polymers with the hydroxy-functional polyesters, even a polyester with a relatively modest tensile strength, such as BIS adipic, can be formulated to have substantially improved tensile strength.

Other suitable synthetic hydroxy-functional polymers for practicing the present invention are described by Formula I in PCT application published as International Publication No. WO 97/23564, on Jul. 3, 1997, inventors Mang and White, the disclosure of which is hereby incorporated in its entirety by reference. The below illustrated repeating structure described by U.S. Pat. No. 5,496,910, inventors Mang, White and Swanson, issued Mar. 5, 1996, incorporated herein by reference and designated here as Formula I is believed to encompass Formula B.

Thus, the Formula I polymers have repeating units represented by the formula:

wherein $R^a$ individually represents a divalent organic moiety which is predominately hydrocarbylene (where the term "hydrocarbylene" means a divalent aliphatic hydrocarbon moiety, such as alkylene, alkenylene or cycloalkylene having 2 to 20 carbons and optionally containing a heteroatomic group, such as oxygen, sulfur, amino, sulfonyl, carboxyl, carbonyl or sulfoxyl, in the chain or pendant thereto) or a combination of different organic moieties which are predominantly hydrocarbylene; $R^c$ is

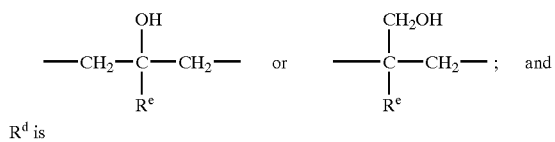

$R^d$ is

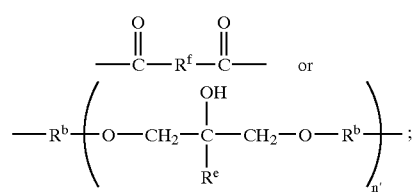

wherein $R^b$ is a divalent organic moiety which is predominantly hydrocarbylene or

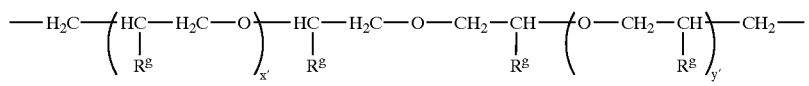

$R^f$ is hydrogen or lower alkyl, such as methyl, ethyl, butyl and propyl, more preferably hydrogen, $R^f$ is independently an organic moiety which is predominantly hydrocarbylene, $R^g$ is independently hydrogen or methyl, n' is an integer from about 0 to about 100, and x' and y' are independently integers from 0 to 100.

Representative divalent organic moieties useful as $R^a$, $R^b$, and $R^f$ include alkylene, cycloalkylene, alkylenearylene, poly(alkyleneoxyalkylene), alkylenethioalkylene, alkylenesulfonylalkylene, alkylene substituted with at least one hydroxyl group, cycloalkylene substituted with at least one hydroxyl group, alkylenearylene substituted with at least one hydroxyl group, poly(alkyleneoxyalkylene) substituted with at least one hydroxyl group, alkylenethioalkylene substituted with at least one hydroxyl group, alkylenesulfonylalkylene substituted with at least one hydroxyl group; arylene, dialkylenearylene, diary leneketone, diarylenesulfone, diary lene oxide, and diarylene sulfide.

In the more preferred hydroxy-functional polyethers, $R^a$, $R^b$ and $R^f$ are independently methylene, ethylene, propylene, butylene, pentamethylene, hexamethylene, heptamethylene, octamethylene, nonamethylene, decamethylene, dodecamethylene, 1,4-cyclohexylene, 1,3-cyclohexylene, or 1,2-cyclohexylene optionally substituted with at least one hydroxyl group, p-phenylene, m-phenylene, or 2,6-naphthalene, diphenyleneisopropylidene, sulfonyldiphenylene, carbonyldiphenylene, oxydiphenylene, or 9,9-fluorenediphenylene and n' is from 0 to 10.

The polymers represented by Formula I may be prepared by reacting diglycidyl esters or aliphatic or aromatic diacids such as diglycidyl terephthalate, or diglycidyl ethers of dihydric phenols or alcohols with aliphatic or aromatic diacids such as adipic or terephthalic acid. Thus, suitable polymers for the present invention can be prepared by reacting a hydroxy-functional aliphatic diacid, optionally in the presence of another diacid with a diglycidyl ether or diglycidyl ester or a mixture of diglycidyl ethers or diglycidyl esters at conditions sufficient to cause the acid moieties to react with the epoxy moieties to form a polymer backbone having ester linkages, as described in U.S. Pat. No. 5,171,820.

Natural Polymers

Among the natural polymers suitable for practicing the present invention are the particularly preferred starches. Starch is a low-cost and abundant natural polymer composed of amylose and amylopectin. Amylose is essentially a linear polymer having a number average molecular weight in the range of 100,000–500,000, whereas amylopectin is a highly branched polymer having a number average molecular weight of up to several million. Unmodified, natural starches are obtained in granular form and may be derived from cereals or grains (such as corn, wheat, rice and sorghum), roots (such as cassava), legumes (such as peas), and tubers such as potato and canna. Such starch granules typically have a particle size less than about 50 µm, which is the preferred particle size when practicing the granule embodiment. While less preferred, flours whose contents are predominately starch, and which may also contain protein, oil and fiber, are operative in the present invention. Where such other natural polymers are used for granular embodiment formulations, they will be processed so as to be in granular form and preferably will have a relatively uniform particle size of about 50 µm or less. Starches derived from potato and canna are less preferred for use due to their relatively large particle size of about 40 µm to about 100 µm.

Starch granules for use in the granule embodiment will normally have a water content of less than about 15 wt. %, more preferably less than about 10–11 wt. %. As will be exemplified, granules may be pre-dried to less than about 1% moisture before compounding. Although preferred, pre-drying is not believed necessary.

Derivatized (modified) starches are also suitable for use in the present invention. "Derivatized starches" is meant to include starches which have been chemically treated so as to form starch esters, starch ethers, and cross-linked starches. "Modified" is meant that the starch can be derivatized or modified by typical processes known in the art (e.g. esterification, etherification, oxidation acid hydrolysis, cross-linking and enzyme conversion). Typically, modified starches include esters, such as the acetate ester of dicarboxylicacids/anhydrides. Particularly useful are the alkenyl-succinic acids and hydrides, ethers (such as the hydroxyethyl and hydroxypropyl starches), starches oxidized with hypochlorite, starches reacted with cross-linking agents such as phosphorus oxychloride, epichlorhydrin, hydrophobic cationic epoxides and phosphate derivatives prepared by reaction with sodium or potassium orthophosphate or tripolyphosphate and combinations thereof These and other conventional modifications of starch are described in publications such as *Starch: Chemistry and Technology*, 2nd edition, editor Whistler et al., and *Starch Derivatives: Production and Uses*, Rutenberg et al., Academic Press, Inc. 1984.

For example, starch esters may be prepared using a wide variety of anhydrides, organic acids, acid chlorides, or other esterification reagents. Examples of anhydrides are acetic, propionic, butyric, and so forth. Further, the degree of esterification can vary as desired, such as from one to three per glucosidic unit of the starch, or as appropriate given the number of hydroxyl groups in the monomeric unit of the natural polymer, if selected to be other than starch. Similar or different esterified natural polymers, with varying degrees of esterification, can be blended together for practicing the present invention. Although esterified starches are stable to attack by amylases, in the environment the esterified starches are attached by microorganisms secreting esterases which hydrolyze the ester linkage.

Starch esters tend to be hydrophobic in contrast to starch raw materials (that is, derived by usual techniques from natural sources such as corn). Thus, depending upon the particular application, one may prefer to choose a hydrophobic starch ester rather than a hydrophilic starch in formulating compositions of the present invention.

Although starches are preferred for use as the natural polymers, particularly due to ready availability and low cost, but as earlier noted other suitable natural polymers (in or prepared to be in granular form of a suitable particle size) are hydroxyl containing polymers such as cellulose, hemicellulose, chitin, guar gum, locust bean gum, pectin, xanthan, algin, agar, and dextran. Some of these can play the role of filler, also. Excellent results have been obtained with both granulated guar gum and cellulose powder.

Other Components

Where the natural polymer structure is expanded then typically such expanded article has been produced as an extrudate. Extrudates typically are claimed to have substantially closed cell structures, although some recent work suggests open cell structures can occur, but in any event the structures have good resilience and compressibility. Expansion, or foaming, is achieved from precursor compositions that include an expansion agent and that are in molten form. Precursor compositions will typically be processed in a suitable apparatus, such as a single screw extruder or a twin screw extruder as are well known in the food science field. Food extruders can be regarded as high temperature, short time reactors, in which granule starch having a moisture content of roughly 10–25% is first compressed into a dense, compact solid and then is converted into a molten, amorphous mass by the high pressure, heat, and mechanical sheer forces encountered during processing. Starch extrudates tend to expand upon exiting the extruder die. Preparation of foamed substrates suitable in practicing the present invention is described, for example, by Tiefenbacher, Karl F., "Starch-Based Foamed Materials - Use and Degradation Properties," J.M.S.—*Pure Appl. Chem.*, A30 (9 & 10), pp. 727–731 (1993).

When water is also used as an expanding agent, then it is normally present in a precursor composition in a range of about 15 wt. % to 20 wt. %, more preferably about 17–18 wt. % of the total precursorcomposition. While water is a typical expansion agent, U.S. Pat. No. 5,252,271, inventor Jeffs, issued Oct. 12, 1993, describes compositions for forming expanded products that include mild acid and a carbonate source so that the releasing carbon dioxide serves as the expansion agent. Nitrogen or other appropriate agents for the expansion may also be used.

In addition to inclusion of an expansion agent, precursor compositions may include various other components known to the art. For example, among known components for precursor compositions to be expanded are nucleating agents, which can improve the uniformity of cells formed during expansion and which tend to make the cells smaller. Suitable nucleating agents are well known in the art and include, for example, talc, silicon dioxide, amorous silicates, spray-dried silicon, calcium carbonate, boron nitride, and the like.

Where the natural polymer base self-supporting structure is a film, then again the precursor composition will typically be processed in a suitable apparatus, such as a single screw extruder or a twin screw extruder.

When one uses a single screw extruder, then normally the precursor composition will have the starch already gelatinized. A precursor composition in which the starch component is to be gelatinized will typically have water present in a range of about 25 wt. % to 30 wt. % with respect to total composition. Water, of course, is the usual liquid in which starch is gelatinized and its role in the gelatinization can be viewed as one of plasticizer. While water is preferred, other gelatinizing agents, or plasticizers, can be used, for example, such as urea or glycerol.

Precursor film compositions can be melt processed into films using either cast or blown film extrusion methods, both of which are described in "Plastics Extrusion Technology—2nd Ed." by Allan A. Griff (Van Nostrand Reinhold, 1976). Cast film is extruded through a linear slot die. Typically, the flat web is cooled on a large moving polished metal roll. It quickly cools, and peels off this first roll passes over one or more auxiliary cooling rolls, then through a set of rubber-coated pull or "haul-off" rolls, and finally to a winder.

In blown film extrusion, the melt is extruded upward through a thin annular die opening. This process is also referred to as tubular film extrusion. Air is introduced through the center of the die to inflate the tube and causes it to expand. A moving bubble is thus formed which is held at constant size by control of internal air pressure. The tube of film is cooled by air blown through one or more chill rings surrounding the tube. The tube is next collapsed by drawing it into a flattening frame through a pair of pull rolls and into a winder.

A plasticizer can be added to the inventive compositions to achieve greater material processability and product flexibility, although plasticizers typically soften the compositions in which they are included. This is not always true, however, of compositions of the present invention, as will be discussed hereinafter. Molded articles and films prepared from blends including plasticizers preferably use plasticizers that are biodegradable. Examples of biodegradable plasticizers include various esters, such as phthalate esters, and various other biodegradable esters known in the chemical arts. Plasticizers (other than water) are particularly preferred for inclusion into blown films, but are typically not needed for cast films.

Inorganic fillers can be added, such as talc, calcium carbonate, diatomaceous earth, and so forth.

Precursor film-forming compositions of the present invention can have part of the hydroxy-functional polymer replaced by a synthetic vinyl polymer such as poly(vinyl alcohol) or "PVA." Thus, amounts of PVA may range from 0–40 wt. % in the total inventive compositions and resulting films which when combined with the hydroxy-functional polyester, will constitute the major component of the compositions. Inclusion of PVA will enhance film softness and film elongation, but does reduce water resistance. Therefore, the choice of whether to add PVA and the selection of the amount to be added will depend upon the balance of properties desired for the resulting films.

Other optional components known in the art, including, but not limited to, anti-blocking agents, anti-static agents, slip agents, pro-heat stabilizers, antioxidants, pro-oxidant, and additives may be incorporated, depending upon the application.

Anti-blocking agents act to prevent film layers from sticking to one another when wound into a roll or when packaged in contact with one another. Typical anti-blocking substances include concentrates of silica or talc blended with a polymeric material such as polyethylene or polycaprolactone.

Reduction of blocking can also be obtained by loading the film surface with small particles or powders such as chalk, clay, silica, starch, and similar materials. Powdered polymeric materials (e.g. polytetrafluoroethylene) can also be used to reduce blocking when applied to the surface of films of the present invention. Such film surface treatments can be used to reduce blocking alone or in combination with other anti-block methods. The quantity of powder anti-block substance commonly added to the surface of a film, when used, is from about 0.5 $g/m^2$ to about 5 $g/m^2$.

Anti-static agents may be incorporated in films of the present invention; examples of such agents include ethoxylated amines and quaternary amine salts having organic constituents of about 12–18 carbon atoms in length. Agents of this type slowly defuse to the surface of the film and, because of their ionic character, form an electrically conductive layer on the surface of the film. Anti-static agents commonly constitute from about 1% to about 5% of the weight of the films, when used.

Slip agents may be incorporated into the films of the present invention to reduce drag over rollers and other forming equipment. Examples of such agents are those commonly derived from amides of fatty acids having about 12–22 carbon atoms. Such agents may augment the anti-blocking properties of the films of the present invention. Such slip agents are commonly incorporated in films from about 0.05% to about 3% of the weight of the films when used.

Method of Making

A method, according to the present invention, is provided for making a biodegradable polymer composition. In general, the method includes providing a first component being a thermoplastic poly (hydroxy ester ether) or a hydroxy-functional polymer and providing a second component being a natural polymer such as starch and optionally other components such as talc. The method includes mixing these components in a single screw extruder, a twin screw extruder, a Banbury mixer, a roll mill or any intensive mixer at a temperature and for a time sufficient to provide an intimate, well-dispersed mixture of the components. Preferably, the components are brought together and processed in an appropriate melt extruder from which the blend is extruded in the form of strands. The strands are then pelletized.

The extrudable composition can be easily converted to foam by extrusion with an appropriate amount of water present in the melt. Extrusion of foam can be performed with a single or twin screw extruder. It is important to have a sufficient level of water in the melt just prior to exit from the die of the foam extruder. This water can be introduced by injection into the foam extruder or by imbibition of water into the composition prior to the extrusion. The amount of water present can vary from 1 wt. % to 50 wt. % of the solid dry feed components and the composition can be processed from 60° C. to 250° C.

The preparation of the composition is also dependent on control of the water content during extrusion. Sufficient water must be added to allow for melt processing, yet the water content of the melt prior to exit from the die should be low enough to not allow foaming to occur. The water content during extrusion can be conveniently controlled by adding an excess of water with the dry feed components, then removal of the excess or at least part of the excess, by venting the extruder or by controlled decreased pressure venting of the extruder barrel. The water can be added at almost any point during the extrusion process. The pellets can also be extruded with an excess of water and subsequently dried to the desired level.

EXPERIMENTAL

Aspects of the present invention will now be illustrated, without intending any limitation, by the following examples. Unless otherwise indicated, all parts and percentages are by weight.

EXAMPLE 1

Precursor compositions of the present invention were made by the method, according to the present invention. Granules of starch, pellets of hydroxy-containing polyester, and a trace amount of talc (as nucleating agent) were provided and admixed with water. This mixture was agitated, heated, and the starch was gelatinized ("compounding"). This compounding was performed on a Brabender PL 2000 torque rheometer using a mixing screw. The water content was 18–21 wt. % before the compounding. Temperatures during the compounding ranged from about 90° C. to about 135° C. The resultant precursor compositions in which starch was present in gelatinized form were in the initial form of strands, which were then air cooled and pelletized. The pellets were adjusted to about 17 wt. % moisture. Specific compositions included as follows: 94 wt. % cornstarch, 5 wt. % Bis Adipic and 1 wt. % talc; 89 wt. % cornstarch, 10 wt. % Bis Adipic and 1 wt. % talc; 94 wt. % cornstarch, 5 wt. % Bis CHD and 1 wt. % talc; and 89 wt. % cornstarch, 10 wt. % BIS DDCA and 1 wt. % talc.

EXAMPLE 2

Formulations of cornstarch (85–95%), Bis Adipic (5–15%), and talc (0.5–1%) were prepared and moisture adjusted to about 17%. These compositions were processed in a Wehger TX-52 Twin Screw Extruder fitted with a slit die of 0.3 mm×6 mm. The extrudates of the various compositions were expanded ribbons of about 25–30 mm in width and 10–12 mm in thickness. The ribbons were then pelletized.

EXAMPLE 3

Formulations of starch, polyester and talc were pre-blended. This blend was processed in a Wenger TX-52 Twin Screw Extruder and water was injected in the extruder to give a moisture content of 25–30% water. Strands exited the die which were allowed to dry overnight. The next day the water level was 10–12% and the strands were chopped (pelletized). These pellets were then fed to the extruder, additional water was added at the extruder, and the exit die produced foam.

EXAMPLE 4

A composition of 63% normal cornstarch (10% moisture), 25% glycerol, 7% urea, and 5% poly (ethylene-co-acrylic acid) was processed on a laboratory twin-screw extruder fitted with compounding screws. The extruded strands were pelletized. The pellets were mixed with BIS Adipic in the ratio of 70% pellets to 30% BIS Adipic. The mixture was processed on the same twin-screw extruder fitted with the same screws. The extruded strands were pelletized.

EXAMPLE 5

A composition of 68% normal cornstarch (10% moisture), 25% glycerol, and 7% urea was processed on a laboratory twin-screw extruder fitted with compounding screws. The extruded strands were pelletized. The pellets were mixed with BIS Adipic in the ratio of 70% pellets to 30% BIS Adipic. The mixture was processed on the same twin-screw extruder fitted with the same screws. The extruded strands were pelletized.

EXAMPLE 6

Inventive granule embodiments were prepared from pre-mixed batches of starch orderivatized starch and polyester and optionally containing plasticizer or other additives. The starches were pre-dried to less than 1% moisture before compounding. Compounding was then accomplished on a Brabender PL2000 torque rheometer using a mixing screw with a fluted dispersive mixing section and a notched distributive section. Strands from the die were air cooled and pelletized.

EXAMPLE 7

A mixture of 90 parts wheat starch, 9.7 parts poly (hydroxy ester ether) and 0.3 parts talc were dry blended in a ribbon blender for 30 minutes. The mixture (moisture content approximately 11.5%) was then fed to a Wenger TX-52 Twin Screw Extruder equipped with a preconditioning chamber. At the die exit a rotary knife was installed to cut the strands into pellets. Using the extrusion conditions described below, flat oval-shaped pellets were produced. The pellets (20.2% moisture based on TGA weight loss after 30 minutes at 1 50° C.) were passed through a conveyorized dryer at 135–145° F. (total residence time 70 minutes, 60 minutes at temp. with a 10 minute cool down) reducing the moisture content to 15.3%.

EXAMPLE 8

A mixture of 80 parts wheat starch, 19.7 parts poly (hydroxy ester ether) and 0.3 parts talc were dry blended in a ribbon blender for 30 minutes. The mixture (moisture content approximately 11.5%) was then fed to a Wenger TX-52 Twin Screw Extruder equipped with a preconditioning chamber. At the die exit a rotary knife was installed to cut the strands into pellets. Using the extrusion conditions described below, flat oval-shaped pellets were produced. The pellets (23.4% moisture based on TGA weight loss after 30 minutes at 150° C.) were passed through a conveyorized dryer at 135–145° F. (total residence time 70 minutes, 60 minutes at temp. with a 10 minute cool down) reducing the moisture content to 13.5%.

| Extrusion Conditions | Example 7 | Example 8 |
| --- | --- | --- |
| Dry Recipe Rate (Kg/hr) | 70 | 70 |
| Feed Screw Speed (rpm) | 15 | 16 |
| Preconditioner Speed (rpm) | 400 | 400 |
| Water Flow to Preconditioner (kg/hr) | 12.3 | |
| Extruder Shaft Speed (rpm) | 170 | 166 |
| Extruder Motor Load (%) | 48 | 51 |
| Water Flow to Extruder (kg/hr) | 4 | 3 |
| Temperature First Head (° C.) | | |
| Temperature Second Head (° C.) | 31 | 31 |
| Temperature Third Head (° C.) | 31 | 31 |
| Temperature Fourth Head (° C.) | 75 | 75 |
| Temperature Fifth Head (° C.) | 75 | 75 |
| Temperature Sixth Head (° C.) | 68 | 66 |
| Temperature Seventh Head (° C.) | 71 | 67 |
| Temperature Eight Head (° C.) | 71 | 67 |
| Temperature Ninth Head (° C.) | 79 | 72 |
| Melt Temperature (° C.) | 110–115 | 110–115 |

EXAMPLE 9

Multiple compoundings have been found useful in dispersing compositions with large amounts of natural polymer.

With the exception of performing the compounding step multiple times, the compositions are prepared using the steps previously outlined in Example 1. The starches were pre-dried to less than 1% moisture and then compounded with a Brabender PL2000 torque rheometer using a mixing screw with a fluted dispersive mixing section and a notched distributive section. Strands from the die were air cooled and pelletized. The compounded pellets were passed a second time through the Brabender PL2000 torque rheometer and the extruded strands were again air cooled and pelletized.

At this point, if it were desirable to perform the compounding step again, the pellets would then be passed through the Brabender PL2000. The resulting strands would then be air cooled and pelletized. This may be repeated until the compounding step no longer substantially improves the properties (such as tensile strength or tensile elongation) of the resulting compositions.

The present invention has been described in an illustrative manner. It is to be understood that the terminology used is intended to be in the nature of words of description rather than of limitation and the examples are intended to illustrate and not limit the scope of the present invention. Therefore, within the scope of the appended claims, the present invention may be practiced other than as specifically described.

What is claimed is:

1. A method of making a biodegradable, polymer composition, said method comprising the steps of:
   providing a first component of a thermoplastic poly (hydroxy ester ether);
   providing a second component being a natural polymer;
   mixing the first component and second component together to form a mixture;
   compounding the mixture;
   pelletizing the compounded mixture to form pellets of a biodegradable polymer composition; and
   reducing a moisture content of the pellets to a range of 17% to about 13.5%.

2. A method as set forth in claim 1 including the steps of forming strands of the compounded mixture prior to said step of pelletizing.

3. A method as set forth in claim 1 including the step of extruding the compounded mixture prior to said step of pelletizing.

4. A method as set forth in claim 1 including the step of drying the pellets.

5. A method as set forth in claim 4 wherein said step of drying comprises passing the pellets through a dryer at a temperature in a range of about 135 ° F. to about 145° F.

6. A method as set forth in claim 1 including the step of admixing the first component and the second component with water.

7. A method as set forth in claim 1 including the step of providing a third component being a nucleating agent and mixing the first component, second component and third component together to form the mixture.

8. A method as set forth in claim 7 wherein said step of mixing comprises dry blending the mixture.

9. A method as set forth in claim 7 wherein the first component is present in 9.7 to 19.7 parts, the second component is present in 80 to 90 parts and the third component is present in 0.3 parts.

10. A method as set forth in claim 7 wherein the natural polymer of the second component is starch.

11. A method as set forth in claim 7 wherein the nucleating agent of the third component is talc.

12. A method as set forth in claim 7 wherein the first component ranges from about 5% to about 15%, the second component ranges from about 85% to about 95% and the third component ranges from about 0.5% to about 1%.

13. A method as set forth in claim 1 wherein said step of compounding comprises compounding the mixture from about 90° C. to about 135° C.

14. A method as set forth in claim 1 wherein said step of compounding comprises feeding the mixture to a twin screw extruder equipped with a preconditioning chamber and heating the mixture from 31° C. to 115° C.

15. A method as set forth in claim 14 wherein the twin screw extruder has a pre-conditioner speed of about 400 rpm.

16. A method as set forth in claim 14 wherein the twin screw extruder has a feed screw speed of about 15 to about 16 rpm.

17. A method as set forth in claim 14, wherein the twin screw extruder has an extruder shaft speed of about 166 to about 170 rpm.

18. A method as set forth in claim 14 wherein the twin screw extruder has a water flow to the pre-conditioning chamber of about 12.3 kg/hr.

19. A method as set forth in claim 15 wherein the twin screw extruder has a water flow to the extruder of about 3 to about 4 kg/hr.

20. A method of making a biodegradable polymer composition, said method comprising the steps of:

providing a first component of a thermoplastic poly (hydroxy ester ether);

providing a second component being a natural polymer;

mixing the first component and second component together to form a mixture;

compounding the mixture by feeding the mixture to a twin screw extruder having a speed of about 15 rpm to about 400 rpm and heating the mixture from 31° C. to about 135° C.; and pelletizing the compounded mixture to form pellets of a biodegradable polymer composition.

21. A method of making a biodegradable polymer composition, said method comprising the steps of:

providing a first component of a thermoplastic poly (hydroxy ester ether);

providing a second component being a starch;

mixing the first component and second component together to form a mixture;

compounding the mixture by feeding the mixture to a twin screw extruder having an extruder shaft speed of about 166 rpm to about 170 rpm, a water flow to the extruder of about 3 kg/hr to about 4 kg/hr, and heating the mixture from 31° C. to about 115° C.;

extruding the compounded mixture and forming strands of the compounded mixture; and pelletizing the compounded mixture to form pellets of a biodegradable polymer composition.

* * * * *

UNITED STATES PATENT AND TRADEMARK OFFICE
CERTIFICATE OF CORRECTION

PATENT NO. : 6,630,543 B1
DATED : October 7, 2003
INVENTOR(S) : William M. Doane et al.

It is certified that error appears in the above-identified patent and that said Letters Patent is hereby corrected as shown below:

Column 2,
Line 64, "polymer;" should read -- Polymer --.

Column 4,
Line 23, "quatemary anmmornium" should read -- quaternary ammonium --.
Line 65, "A" should read -- $R^1$ --.

Column 7,
Line 35, "$R^{c}$" should read -- $R^e$ --.
Lines 47 and 48, "$R^f$" should read -- $R^e$ --.
Line 62, "diary leneketone" should read -- diaryleneketone --.
Line 63, "diary lene" should read -- diarylene --.

Column 9,
Line 1, "dicarboxylicacids/anhydrides" should read -- dicarboxylic acids/anhdrides --.

Column 10,
Line 4, "percursorcomposition" should read -- precursor composition --.

Column 12,
Line 59, "Wehger" should read -- Wenger --.

Column 13,
Line 32, "orderivatized" should read -- or derivatized --.
Line 52, "1 50°" should read -- 150° --.

Signed and Sealed this

Twenty-fifth Day of May, 2004

JON W. DUDAS
*Acting Director of the United States Patent and Trademark Office*